Patented Nov. 12, 1946

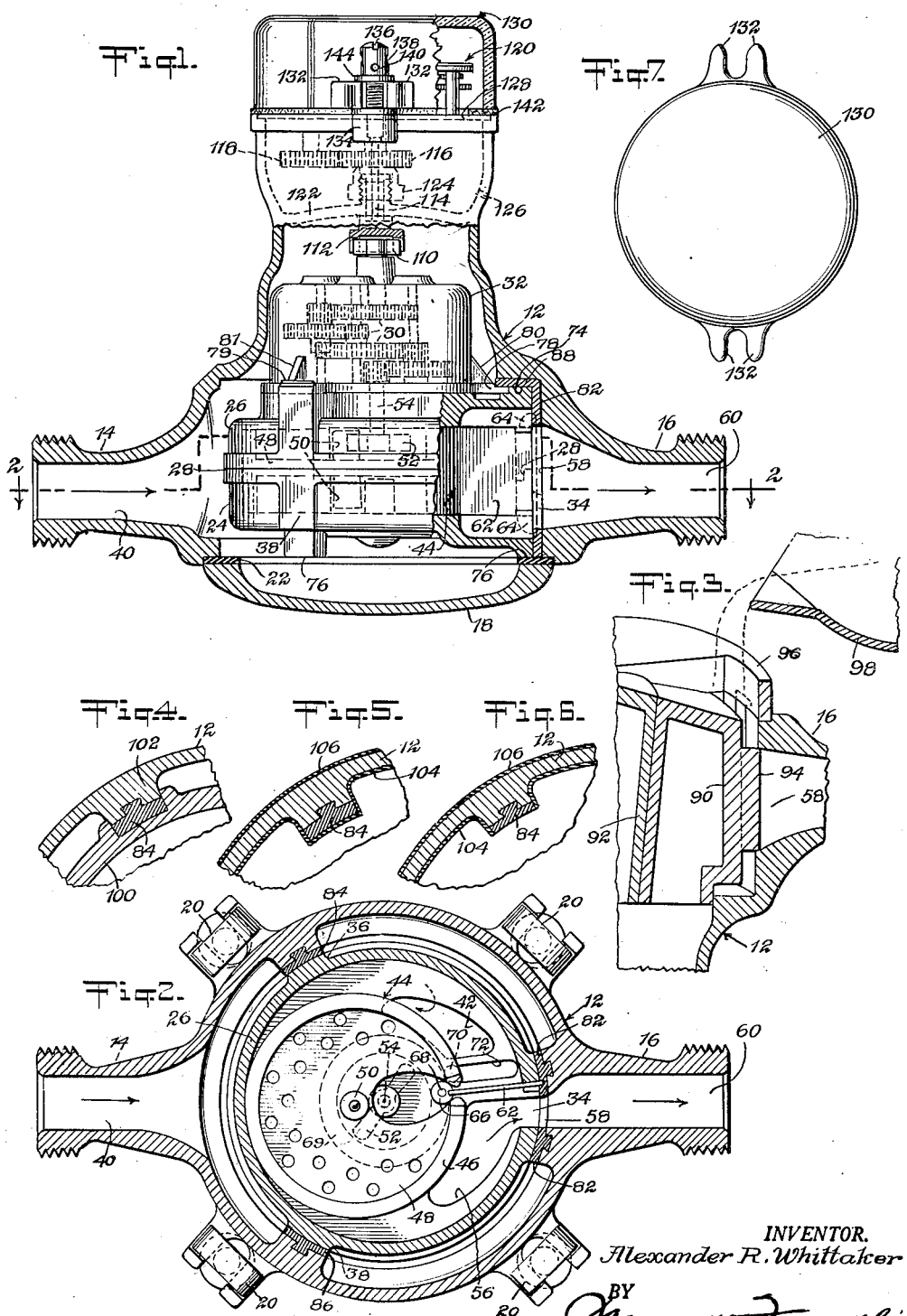

2,410,852

UNITED STATES PATENT OFFICE 2,410,852

FLUID METER

Alexander R. Whittaker, New York, N. Y., assignor to Rockwell Manufacturing Company, a corporation of Pennsylvania Application May 22, 1942, Serial No. 444,034

12 Claims. (Cl. 73—257)

This invention relates to meters, and more particularly to water meters.

The primary object of my invention is to generally improve meters, particularly water meters. A more specific object of the invention is to improve meters of the type disclosed in my co-pending application Serial Number 420,407, filed November 25, 1941.

In that meter the measuring chamber and gear housing are made of axially separable parts which are slid upwardly into a meter body and which are held by a relatively large frost plate bolted against the open bottom of the meter body and against the lowermost of said inner parts. The inner parts are held accurately in position by means of contact surfaces on the outside of the measuring chamber, snugly fitted to mating contact surfaces on the inside of the meter body. In accordance with one feature and object of the present invention, the contact surfaces on the inside of the meter body are made of a relatively soft metal, such as lead and its alloys, thereby providing an accurate, leak-proof fit therebetween. Common bearing metals, such as babbitt, may be used, but are not essential because the meter parts are stationary. This construction also guards against any possibility of the inner parts becoming stuck to the inside of the meter body, which would prevent removal for inspection or repair.

A further object of the invention is to minimize the use of rust-proof metal, thus leading to substantial economy in manufacture, and saving of strategic metal needed for military use. The greatest bulk of metal is in the meter body, formerly made of bronze. This may instead be made of cast iron, and the cast iron may be protected against rust by the use of a suitable paint, for example, that known commercially as Resistin. However, it is not satisfactory to use paint on the contact surfaces where an accurate machined fit is required between the measuring chamber and the meter body. On the other hand, it is not satisfactory to make these contact surfaces of bare cast iron, because of the danger of electrolytic action and rust. The measuring chamber may become rusted into and non-removable from the meter body.

In accordance with my invention, this difficulty is overcome by the use of the soft metal liners previously referred to, for these are rust-proof, and the ferrous meter body may be protectively painted everywhere except at the exposed contact surfaces.

In the production of a fluid meter including my invention, the meter body is initially cast with undercut or dove-tail-sectioned grooves at the desired location of the contact surfaces. The meter body is inverted, and an appropriate sectional core is inserted, this core forming molding cavities or spaces on the inside of the meter body at the aforesaid dove-tail grooves. The soft, rust-proof metal is molten and poured into the aforesaid spaces, the resulting contact liners being thicker than their final dimension, and being securely anchored to the meter body by the dove-tail grooves. The entire meter body is then coated on the inside (and on the outside then or later) with a rust-proof paint, following which both the paint coating and the excess liner metal is machined away at the contact surfaces until brought to exact desired dimension to mate with the corresponding contact surfaces on the outside of the measuring chamber and gear housing.

To the accomplishment of the foregoing and such other objects as will hereinafter appear, my invention consists in the meter elements and their relation one to the other, as hereinafter are more particularly described in the specification, and sought to be defined in the claims. The specification is accompanied by a drawing in which:

Fig. 1 is a partially sectioned elevation of a meter embodying features of my invention;

Fig. 2 is a horizontal section taken approximately in the plane of the line 2—2 of Fig. 1;

Fig. 3 is a schematic drawing illustrating one method of applying the liners to the inside of the meter body;

Fig. 4 is a fragmentary horizontal section showing the relation of the core to the meter body when the liner metal is being added;

Fig. 5 is a similar section showing a later stage in the process, after adding a rust-proof paint;

Fig. 6 is a similar section showing the parts after machining the liner to dimension; and Fig. 7 is a plan view of the glass cover for the register.

Referring to the drawing, and more particularly to Figs. 1 and 2, the meter comprises a meter body 12 having integrally cast inlet and outlet connections 14 and 16. The meter body is closed at the bottom by means of a frost plate 18 which is bolted against the open bottom of meter body 12 by means of four bolts 20 (Fig. 2). These pass through ears having open slots, there being four such ears cast integrally with the meter body, and another four cast integrally with the frost plate 18. The bolts may be made of galvanized iron, but are preferably used with brass nuts, in order to guard against any possibility of the nuts becoming immovably rusted to the bolts. In the present case the heads of the bolts are T-shaped, as shown in Fig. 2. A gasket 22 (Fig. 1), made of rubber or other suitable soft material, is disposed between the meter body and the frost plate.

The measuring chamber comprises a lower portion 24 and an upper portion 26 secured together with a joint at 28. Preferably said chamber is made of bronze. An intermediate train of gearing generally designated 30 is housed in a gear housing 32 also preferably made of bronze. The top of the measuring chamber acts as a bottom for the gear housing. Appropriate hard rubber bushings are provided for the various shafts, so that water surrounding the measuring chamber and gear housing may act as a lubricant. However, the gear housing itself is enclosed, and may carry a heavy oil or grease for lubrication of the meshing gear teeth.

The measuring chamber is generally cylindrical, and is formed with upright or axially directed contact surfaces on the outside. Referring to Fig. 2, there is a main contact surface around the water passage 34 (in this case an outlet passage). Additional contact surfaces are provided at 36 and 38. The contact surfaces at 34 and 38 are also visible in Fig. 1. All of these contact surfaces are substantially cylindrical, but are preferably slightly tapered or conoidal so as to facilitate insertion of the inner parts into and removal from the meter body. The meter body is provided with mating contact surfaces to properly locate the measuring chamber within the meter body. Considered in another aspect, the purpose of the narrower contact surfaces 36 and 38 is to hold the main wide contact surface at 34 tightly against the mating contact surface of the meter body with a leakproof fit, so that there will be no leakage between the inlet water surrounding the measuring chamber and the discharge water flowing outwardly through the port 34.

Inasmuch as the general structural features and operation of this meter are set forth in greater detail in my co-pending application Serial number 420,407 aforesaid, they need not be described in excessive detail here, but it may not be amiss to briefly point out that water from inlet 40 fills the meter body and surrounds the measuring chamber and gear housing. It flows into the measuring chamber through ports 42 in the top and bottom walls of the measuring chamber. The port 42 in the bottom is clearly shown in Fig. 2, and a similar passage is provided directly thereover in the top. The piston 44 is a conventional hard rubber piston of the balanced oscillating type, and comprises a cylindrical skirt 46 with a horizontal, perforated web 48 halfway between the top and bottom of the piston. A stud 50 projects upwardly and downwardly from the web 48, the bottom projection acting as a guide, and the top projection acting to turn a key 52 on a shaft 54 projecting upwardly into the gear housing.

The water leaving the meter flows through passages 56 in the top and bottom walls of the measuring chamber. These are blind recesses which lead to the upper and lower ends of the outlet port 34, the latter extending almost but not all the way from the top to the bottom of the contact surface. The outlet port 34 registers with a mating port 58 in the meter body, said port leading directly to the outlet connection 60.

The incoming and outgoing liquid is divided by a division plate or bridge 62 (Figs. 1 and 2). The upper and lower edges of this division plate may be provided with lugs or projections 64 (Fig. 1) which are received in mating grooves milled into the top and bottom of the measuring chamber. The inner edge may be enlarged at 66 (Fig. 2) and held in position by a pin 68 passing through said enlargement into the guide ring 69 on the bottom of the measuring chamber. The piston may be additionally guided by a small rubber roller or piston pilot 70 reciprocable in a groove 72.

The outer edge of the division plate or bridge 62 preferably projects radially outwardly from the measuring chamber for a short distance, and may be used as a locating key to insure proper orientation of the measuring chamber in the meter body, it being received in a mating groove in the meter body.

In Fig. 1 it will be seen that the upper part of the measuring chamber has machined top surfaces 74, while the lower part of the measuring chamber has machined bottom surfaces 76. These are located at the upper and lower ends of the axial contact surfaces. The machined top and bottom surfaces are accurately dimensioned so that when the bottom plate 18 is bolted in position, it will function to hold the upper and lower parts of the measuring chamber tightly together. The gasket 22 is preferably interposed, thus affording some yieldability at the joint, to prevent leakage.

The bottom plate 18 may be weakened to act as a frost plate which breaks in the event of freezing of the water in the meter. One advantage of the present construction is that upon breakage of the frost plate, the holding pressure between the upper and lower halves of the measuring chamber is immediately relieved, thus permitting the same to move apart, and so avoiding breakage of the same.

Referring to Fig. 1, it will be seen that an arm 78 projects outwardly from gear housing 32, and comes beneath a part of the meter body. This arm is strengthened by a web 80. There are three such arms, another one of which is visible at 79, 81 in Fig. 1. They are located at the contact surfaces, and their top surfaces are accurately machined or finished flush with the top contact surfaces 74. An advantage of this construction is that the pressure of the bottom plate 18 of the meter holds the gear housing tightly in assembled relation with the measuring chamber, at the same time that it holds the halves of the measuring chamber together.

Heretofore the meter body has been made of a rust-proof metal, specifically bronze. The same metal, but a very much smaller quantity thereof, is used for the measuring chamber and gear housing. In accordance with the present invention, the cost of the meter is greatly reduced by making the meter body of a cheaper metal, specifically a ferrous metal, such as ordinary cast iron. This change has the additional advantage of minimizing the amount of strategic metal of military value needed to manufacture the meter.

Cast iron is subject to rust. This may be overcome by coating the same with a suitable rust-proof paint, for example, that known commercially as Resistin. However, a paint coating cannot be satisfactorily used at the contact surfaces where the measuring chamber and meter body are brought together with very small tolerance. It is not desirable to simply machine away the rust-proof coating at the contact surfaces, because the resulting exposure of the iron at these points may lead to electrolytic action and to rust. Apart from deterioration of the meter, this may result in the measuring chamber becoming rusted into or stuck in the meter body, thus making it difficult to remove for purposes of inspection and repair.

In accordance with the present invention, this difficulty is overcome, and an improved rust-proof contact surface of extreme accuracy is provided, by using a soft rust-proof metal as a lining for the contact surfaces on the inside of the meter body. A specific example is the well-known Babbitt metal, but lead and numerous lead alloys or equivalent soft metals may be used. These have a low melting temperature, and form a smooth, relatively soft liner, which is easily worked and polished, and which provides the desired close tolerance between the inner parts and the meter body. It is easy to obtain a leak-proof seal when using these soft metals. Another advantage is that the liners may be removed and replaced in case their fit with the inner parts should become spoiled in any way.

Referring to Fig. 2, the soft metal liners are clearly shown at 82, for the outlet 58; at 84 for the contact surface 36; and at 86 for the contact surface 38. It will be noted that these are secured within the meter body by grooves having an undercut or dove-tailed section, thus securely anchoring the liners to the meter body. In Fig. 1, it will be seen that the liner 82 has a top portion 88 forming a direct integral continuation of the cylindrical portion 82. The same is true at the other two liners, though these are not visible in Fig. 1. Thus both the top and side surfaces which are accurately machined to fit the inner parts with great exactness, are all lined with the relatively soft, rust-proof metal.

Referring to Fig. 2, the vertical groove or keyway in the meter body which receives the key or projecting outer edge of the bridge plate 62, is also formed in the liner 82. It will be understood that the liners marked 82 at each side of the outlet 58 are really parts of a single liner, because they are joined in circumferential direction at the top and bottom, this being clear from Fig. 1. However, because of the large area cut away for the outlet passage 58, and because of the excessive area of the liner, two anchor grooves are preferably provided, these being clearly shown in Fig. 2.

The liners are most conveniently added to and secured within the meter body by pouring or molding the same in position. This is schematically illustrated in Fig. 3, in which it will be seen that the cast-iron meter body 12 has been inverted, and a core 90 inserted therein. This core is preferably a sectional core, it being made of a number of parts such as the part 90, which are preliminarily inserted in position and then forced outwardly and held in position by a frustro-conical central part 92. The part 90 shown in Fig. 3 molds the liner 82 at the outlet passage 58, and is therefore provided with a projection 94 which stops the outlet port. The sections for the other liners may be shaped at the outside as shown in Fig. 4, at the numeral 100. The tops of the core sections are preferably formed with an upwardly projecting rim 96 (Fig. 3) acting as a gate or guide to facilitate pouring of the molten liner metal from a ladle 98. If desired, the gates may be connected to a single pouring point. The poured metal runs into the dove-tail anchor grooves and fills the molding cavity or space provided by the core. This is so dimensioned as to provide a liner of somewhat excessive thickness. The top as well as the side portions of the liners are provided at this time.

The method of my invention may be further described with reference to Figs. 4, 5 and 6. Fig. 4 shows how a section 100 of the sectional core fits against a ridge 102 of the meter body 12. The core 100 forms a molding cavity at the inner face of the ridge 102, and the molten metal when poured into position, fills the cavity and the dovetail anchor groove, as is clearly shown at 84.

Thereafter, the iron meter body 12 is coated with a suitable rust-proof paint, this being applied over the entire interior of the meter body, as is clearly shown at 104. The same material is used on the outside of the meter body, as shown at 106, but the outside coat may, if desired, be applied later, after the interior of the meter body has been machined to dimension. The paint coating has been omitted in Figs. 1 and 2 because of the small scale of the drawing, and in order not to confuse the same.

Referring now to Fig. 6, the machining operation cuts away the coating on the inner face or contact surface, and also cuts away some of the liner metal, until the liner has been turned down to exact desired dimension. It will be understood that all of the contact surfaces are simultaneously turned down. The same applies to the top contact surfaces.

It will also be understood that if desired, holes or recesses, either plain or undercut, may be provided in the meter body above the top liners in order to further anchor the bearing metal to the meter body at these points.

The reduction gearing in the gear housing 32 terminates in a key 110. This mates with a socket 112 at the lower end of a shaft 114, the upper end of which is keyed to a gear 116. The latter meshes with a gear 118 carried on a shaft projecting upwardly into and forming a part of the register. This may be conventional in character, and is generally designated 120. The register 120 may be of the dial type, or of the straight-reading type.

The meter body has a horizontal partition wall 122 across the upper portion or neck. This includes an upwardly projecting, threaded stud over which is received a packing nut 124. The latter is tightened against packing to prevent leakage of water up into the top of the meter body. Any slight seepage may escape through a vent 126.

The register has circular top and bottom plates separated by spacers. The bottom plate 128 is set into a mating annular recess in the top of the meter body. In the meter described in my copending application Serial Number 420,407 aforesaid, the register is housed in a separate bronze casting, closed by a hinged top. In the present invention, this entire bronze upper portion of the meter body is eliminated, and is replaced by an inverted, transparent glass cover 130. This is preferably made of molded glass, suitably tempered to make the same substantially shock-proof or break-proof. It is provided with outwardly projecting slotted ears 132 (Fig. 7) which are molded integrally therewith. These mate with outwardly projecting metal ears 134 (Fig. 1) on the meter body. The ears 134 have threaded holes to receive a pair of sealing screws 136, these screws being of conventional character, and having holes 138 and 140 through the heads for the reception of sealing wires. A gasket 142 extends around the register between the top edge of the meter body and the bottom edge of the glass cover. This gasket may be made of cork, rubber, soft fibre, or any other suitable material. If desired, fibre washers 144 may be inserted between the heads of the sealing screws 136 and the top of the ears projecting from the glass cover.

The glass cover improves the appearance of the meter, and has the advantage of economy, and the further advantage of additionally substantially reducing the amount of bronze or rust-proof metal required.

It is believed that the improved meter construction of my invention, and one preferred method of making the same, as well as the advantages thereof, will be apparent from the foregoing detailed description thereof. It will also be apparent that while I have shown and described my invention in a preferred form, many changes and modifications may be made without departing from the spirit of the invention, as sought to be defined in the following claims.

I claim:

1. A water meter comprising a hollow ferrous body including an openable ferrous frost plate secured to the bottom of said body, a measuring chamber made of a rust-proof metal, top and side contact surfaces in the body for accurate fit and location of the measuring chamber within the body, said contact surfaces being made of soft, rust-proof liners secured to the meter body, and a rust-proof paint coating the body and frost plate except at the faces of said liners which contact the measuring chamber.

2. A water meter comprising a hollow cast-iron body including an openable cast-iron frost plate secured to the bottom of said body, a measuring chamber and gear housing made of axially superposed bronze parts, top and side contact surfaces in the meter body for accurate fit and location of the bronze parts within the body, said contact surfaces being made on relatively soft bearing metal secured to the meter body, and a rust resisting interior coating on the body and frost plate except at the faces of said relatively soft bearing metal liners which bear against the aforesaid bronze parts.

3. A meter comprising a main body including inlet and discharge connections cast integrally therewith, a measuring chamber having three axially directed slightly tapered contact surfaces on the outside, a piston within said measuring chamber, a bridge in said measuring chamber for cooperation with said piston, one of said contact surfaces being disposed near the bridge and being apertured to provide a port communicating with discharge passages in the top and bottom walls of the measuring chamber, inlet ports passing through the top and bottom walls of the measuring chamber on the opposite side of the bridge, said meter body having three soft metal liners accurately machined to receive said contact surfaces and properly locate the measuring chamber, one of these having a port therethrough registering with the first-named port, and two of the liners acting to hold the third contact surface and registering ports with so tight a fit as to prevent leakage between the liquid surrounding the measuring chamber and the liquid passing through the ports.

4. A water meter comprising a main body including inlet and discharge connections, a measuring chamber having three axially directed slightly tapered contact surfaces on the outside, a piston within said measuring chamber, a bridge in said measuring chamber for cooperation with said piston, the outer edge of said bridge projecting outside the measuring chamber to act as a locating key when inserting the measuring chamber through the bottom of the meter body, one of said contact surfaces being disposed near the bridge and being apertured to provide a port communicating with discharge passages in the top and bottom walls of the measuring chamber, inlet ports through the top and bottom walls of the measuring chamber on the opposite side of the bridge, said meter body having three soft metal liners accurately machined to receive said contact surfaces and properly locate the measuring chamber, one of these having a port therethrough registering with the aforesaid port, and also having a slot to receive the aforesaid projecting bridge edge, and two of the liners acting to hold the third contact surface and registering ports with so tight a fit as to prevent leakage between the water surrounding the measuring chamber and the water passing through the ports.

5. A water meter comprising a main body made of ferrous metal, and including inlet and discharge connections cast integrally therewith, a measuring chamber made of rust-proof metal and having three axially directed slightly tapered contact surfaces on the outside, a piston within said measuring chamber, a bridge in said measuring chamber for cooperation with said piston, one of said contact surfaces being disposed near the bridge and being apertured to provide a port communicating with discharge passages in the top and bottom walls of the measuring chamber, inlet ports passing through the top and bottom walls of the measuring chamber on the opposite side of the bridge, said meter body having three soft metal liners accurately machined to receive said contact surfaces and properly locate the measuring chamber, and one of these having a port therethrough registering with the aforesaid port, two of the liners acting to hold the third contact surface and registering ports with so tight a fit as to prevent leakage between the water surrounding the measuring chamber and the water passing through the registering ports, the meter body being coated with a rust-proof paint except at the aforesaid machined surfaces of the metal liners.

6. A water meter comprising a main body made of ferrous metal, and including inlet and discharge connections cast integrally therewith, a relatively large frost plate made of ferrous metal bolted to and closing the otherwise open bottom of said meter body, a measuring chamber made of rust-proof metal and comprising two parts joined together to form an approximately cylindrical chamber having three axially directed contact surfaces and also top and bottom contact surfaces on the outside, a piston of the oscillating type within said measuring chamber, a bridge in said measuring chamber for cooperation with said piston, one of said contact surfaces being disposed near the bridge and being apertured to provide a port communicating with recesses in the top and bottom walls of the measuring chamber, additional water passages passing through the top and bottom walls of the measuring chamber on the opposite side of the bridge, said meter body having three top and three side liners made of soft rust-proof metal and accurately machined to receive said contact surfaces and properly locate the measuring chamber, one of these having a port therethrough registering with the aforesaid port, two of the liners acting to hold the third contact surface and registering ports with so tight a fit as to prevent leakage between the water surrounding the measuring chamber and the water passing through the ports, the meter body and frost plate being coated with a rust-proof paint except at the soft metal contact surfaces of the liners, said frost plate holding the parts of the measuring chamber together so that breakage of the frost plate will permit separation of the measuring chamber without breakage of the latter.

7. A water meter comprising a ferrous meter body, a ferrous frost plate secured to the bottom of said body, a gear housing and a measuring chamber made of rust-proof parts and disposed in axially superposed relation, said meter body having contact surfaces made of a soft rust-proof metal at bearing points against the gear housing and the measuring chamber, the frost plate being sealed to the body by a gasket and also pushing upwardly against contact surfaces which react upwardly through said measuring chamber against the gear housing, the body and frost plate being coated with rust-proof paint, except on the aforesaid soft metal contact surfaces which are machined away to accurately fit mating machined contact surfaces on the rust-proof parts, said frost plate holding the measuring chamber and gear housing in said meter body.

8. A water meter comprising a ferrous meter body, a ferrous frost plate secured to the bottom of said body, a measuring chamber made of rust-proof parts disposed inside said body, said meter body having contact surfaces made of a soft rust-proof metal at bearing points against the measuring chamber, the frost plate being sealed to the body by a gasket and also pushing upwardly against contact surfaces at the bottom of the measuring chamber, the body and frost plate being coated with rust-proof paint, except on the aforesaid soft metal contact surfaces which are machined away to accurately fit mating machined contact surfaces on the measuring chamber, said frost plate holding the measuring chamber in said body, so that breakage of the frost plate will permit separation of the measuring chamber from said body.

9. A water meter comprising a ferrous meter body, a ferrous frost plate secured to the bottom of said body, a measuring chamber and gear housing made of three rust-proof parts disposed in axially superposed relation inside said body, the middle part acting as the top of the measuring chamber and also as the bottom of the gear housing, said meter body having contact surfaces made of a soft rust-proof metal at bearing points against the gear housing and measuring chamber, the frost plate being sealed to the body by a gasket, the body and frost plate being coated with rust-proof paint, except on the aforesaid soft metal contact surfaces which are machined away to accurately fit mating machined contact surfaces on the gear housing and measuring chamber, said frost plate holding the gear housing and measuring chamber in said body, so that breakage of the frost plate will permit separation of the gear housing and measuring chamber from said body.

10. A water meter comprising a cast iron meter body, a cast iron frost plate secured to the bottom of said body, a measuring chamber and gear housing made of three bronze parts disposed in axially superposed relation inside said body, the middle part acting as the top of the measuring chamber and also as the bottom of the gear housing, the top part having arms extending outwardly and lying in the same plane as parts of the middle portion, said meter body having contact surfaces made of a soft rust-proof metal at bearing points against the aforesaid arms of the gear housing and at bearing points with the measuring chamber, the frost plate being sealed to the body by a gasket which also bears against contact surfaces at the bottom of the measuring chamber, the body and frost plate being coated with rust-proof paint, except on the aforesaid soft metal contact surfaces which are machined away to accurately fit mating machined contact surfaces on the bronze parts, said frost plate holding the bronze parts together, so that breakage of the frost plate will permit separation of the bronze parts without breakage of the latter.

11. In a liquid meter, a hollow meter casing having inlet and outlet ports for a liquid to be passed therethrough and composed of a metal normally liable to corrode or rust when exposed to said liquid, a measuring chamber within said casing between said ports having a plurality of spaced lateral surfaces, and a plurality of spaced liner members having machined surfaces engaging said first mentioned surfaces secured within said casing, said liner members being composed of a readily machinable softer metal which is resistant to corrosion or rust by said liquid so as to provide an accurately fitted corrosion or rust-proof joint between said measuring chamber and the casing enabling the chamber to be readily taken from the casing even after considerable usage.

12. In the liquid meter defined in claim 11, a plurality of internal projections within said casing, and said liner members being cast on said projections prior to machining.

ALEXANDER R. WHITTAKER.